United States Patent
Volpe et al.

(10) Patent No.: US 11,775,272 B1
(45) Date of Patent: Oct. 3, 2023

(54) DEPLOYMENT OF SOFTWARE PROGRAMS BASED ON SECURITY LEVELS THEREOF

(71) Applicant: INTERNATIONAL BUSINESS MACHINES CORPORATION, Armonk, NY (US)

(72) Inventors: Gianluca Volpe, Rome (IT); Donatello Carriero, Rome (IT); Gianluca Gigliarelli, Rome (IT); Roberto Ragusa, Rome (IT); Wanda Righi, Rome (IT)

(73) Assignee: International Business Machines Corporation, Armonk, NY (US)

(*) Notice: Subject to any disclaimer, the term of this patent is extended or adjusted under 35 U.S.C. 154(b) by 56 days.

(21) Appl. No.: 17/656,237

(22) Filed: Mar. 24, 2022

(51) Int. Cl.
| | |
|---|---|
| *G06F 9/455* | (2018.01) |
| *G06F 7/04* | (2006.01) |
| *G06F 21/51* | (2013.01) |
| *H04L 29/06* | (2006.01) |
| *G06F 9/445* | (2018.01) |
| *G06F 8/60* | (2018.01) |
| *G06F 21/56* | (2013.01) |

(52) U.S. Cl.
CPC ............ *G06F 8/60* (2013.01); *G06F 21/56* (2013.01); *G06F 2221/033* (2013.01)

(58) Field of Classification Search
CPC .......... G06F 21/51; G06F 21/577; G06F 8/61; G06F 9/454; G06F 8/60; G06F 21/56; G06F 2221/033
See application file for complete search history.

(56) References Cited

U.S. PATENT DOCUMENTS

| | | | |
|---|---|---|---|
| 9,355,248 B1 | 5/2016 | Wiest | |
| 10,536,478 B2 | 1/2020 | Kirti | |
| 11,663,361 B2 * | 5/2023 | Delaney | H04L 63/105 726/2 |
| 2016/0110549 A1 | 4/2016 | Schmitt | |
| 2017/0109536 A1 | 4/2017 | Stopel | |
| 2021/0124830 A1 | 4/2021 | Dinh | |
| 2021/0132935 A1 | 5/2021 | Dinh | |

OTHER PUBLICATIONS

Ullah et al., Automatic Provisioning, Deploy and Monitoring of Virtual Machines Based on Security Service Level Agreement in the Cloud, 2 pages (Year: 2014).*
Mell et al., "The NIST Definition of Cloud Computing," Recommendations of the National Institute of Standards and Technology, U.S. Department of Commerce, Special Publication 800-145, Sep. 2011, 7 pgs.

* cited by examiner

*Primary Examiner* — Thuy Dao
(74) *Attorney, Agent, or Firm* — Jeffrey M. Ingalls (57) ABSTRACT

A solution is proposed for deploying software programs. A corresponding method comprises calculating a program security indicator of each software program according to corresponding component security indicators of software components being used by the software program. A computing system (or more) is selected for deploying the software program according to a comparison between the program security indicator and corresponding system security indicators of a plurality of available computing systems. A computer program and a computer program product for performing the method are also proposed. Moreover, a corresponding system is proposed.

14 Claims, 8 Drawing Sheets

DEPLOYMENT OF SOFTWARE PROGRAMS BASED ON SECURITY LEVELS THEREOF

BACKGROUND

The present disclosure relates to the information technology field. More specifically, this disclosure relates to the security of computing systems.

Security is a critical issue in computing systems. In fact, the computing systems may be exposed to several threats (e.g., malicious software or malware), due to the possibility that attacks thereto may take place (causing damage having negative effects) by exploiting vulnerabilities of the computing systems.

SUMMARY

The present embodiments are based on the general idea of deploying software programs based on security levels thereof Particularly, an embodiment provides a method for deploying software programs. The method comprises calculating a program security indicator of each software program according to corresponding component security indicators of software components being used by the software program. A computing system (i.e., one or more) is selected for deploying the software program according to a comparison between the program security indicator and corresponding system security indicators of a plurality of available computing systems.

A further aspect provides a computer program for implementing the method.

A further aspect provides a corresponding computer program product.

A further aspect provides a system for implementing the method.

The above summary is not intended to describe each illustrated embodiment or every implementation of the present disclosure.

BRIEF DESCRIPTION OF THE DRAWINGS

The drawings included in the present application are incorporated into, and form part of the specification. They illustrate embodiments of the present disclosure and, along with the description, explain the principles of the disclosure. The drawings are only illustrative of certain embodiments and do not limit the disclosure.

DETAILED DESCRIPTION

As discussed above, many types of malicious software, or malware, exist that are intentionally designed to perform harmful operations on the computing systems (for example, disrupting their operation, gaining unauthorized access to information, preventing access to information and so on). Therefore, anti-malwares are commonly used to protect the computing systems from malwares; the anti-malwares are aimed at preventing the installation of the malwares, detecting activities performed by them and removing their threads.

Nevertheless, the computing systems may have vulnerabilities that do not allow them to withstand the effects of (hostile) attacks. Particularly, many attacks exploit vulnerabilities of software programs that run on the computing systems. For example, these vulnerabilities generally derive from programming bugs, design flaws, unchecked inputs, unprotected communications and so on. Moreover, the increasing complexity and connectivity of the software programs accordingly magnify the probability of having vulnerabilities in the software programs.

New vulnerabilities of the software programs are continuously discovered (for example, by means of automatic tools, deeper testing and so on). Therefore, the software programs are upgraded over time to fix the known vulnerabilities (for example, by distributing new versions thereof). However, zero-day vulnerabilities that are still unknown or for which no remediation is available yet may be exploited to attack the computing systems. Moreover, even when upgraded versions of the software programs are available, previous (and then more vulnerable) versions thereof generally remain in use for a relatively long time.

Therefore, additional (security) countermeasures may be implemented in the computing systems. For example, a zero-trust security model may be applied; in this case, every activities to be performed in the computing systems are not trusted by default, and then an accurate verification is performed individually for each request of performing a corresponding activity. In addition to, or in the alternative, a network bandwidth is limited for the software programs running on the computing systems, so as to defend them from Denial-of-Service (DoS) attacks.

However, these countermeasures are not of general applicability. In any case, they involve an overhead of the computing systems, with corresponding degradation of their performance.

The impact of the damages that are caused by possible attacks to the computing systems (exploiting their vulnerabilities, and especially the ones of the software programs running thereon) may be very high. This is particularly critical in cloud (computing) environments. In this case, (cloud) services are provided to corresponding users by cloud providers, which provision, configure and release computing resources required for their implementation upon request (with an actual implementation of the services that is completely opaque to the users). Particularly, Platform as a Service (PaaS) functionalities make available (virtual) software platforms. Each software platform implements an environment wherein software applications of the users may run (in addition to supporting other activities of their life cycle).

In this case, the software applications of the different users share the computing systems of the cloud providers that are used to implement their software platforms. Therefore, any attack exploiting the vulnerability of a generic software application may damage the computing systems of its software platform. The damage of these computing systems then impacts (in addition to possible other software applications of the user running on the same software platform) all the other software platforms implemented on the same computing systems, and then all the other software applications running thereon that generally belong to other users. This may have a detrimental effect on the entire PaaS functionality of the cloud provider, and particularly on its performance and reliability.

With reference in particular to FIGS. 1A-1D, the general principles are shown of the solution according to an embodiment of the present disclosure.

Figure 1A:
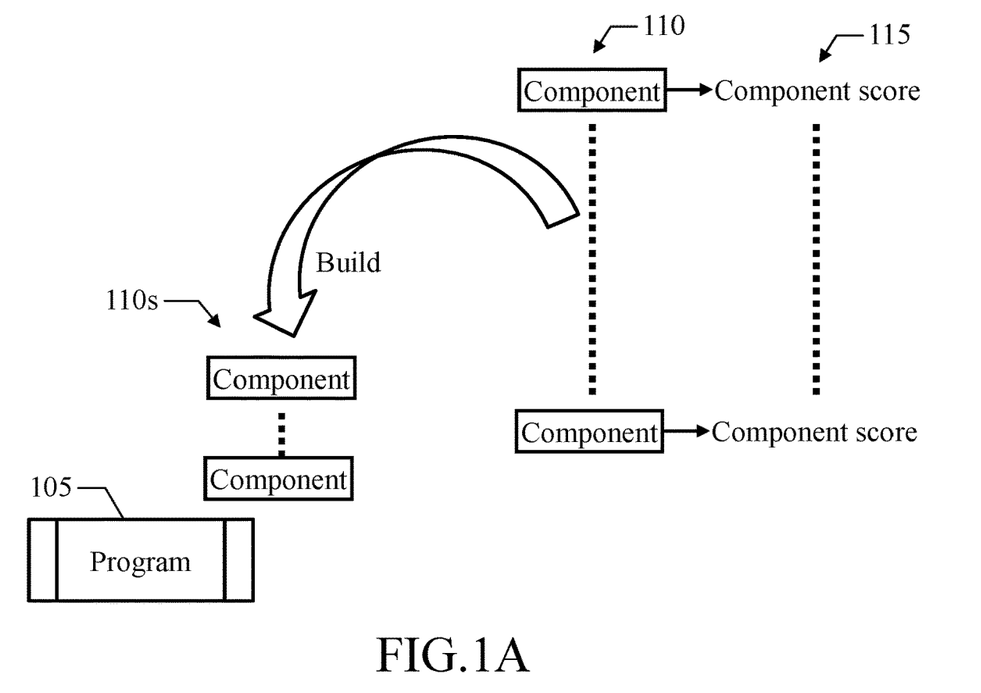
FIGS. 1A-1D show the general principles of the solution according to an embodiment of the present disclosure.

Referring initially to FIG. 1A, a software program 105 is to be deployed to make it available for use (for example, by a user of a cloud provider exploiting a PaaS functionality thereof). The software program 105 is configured to use one or more (selected) software components that are selected among a plurality of software components 110 being available (differentiated with the reference 110s). For example, the software program 105 is a container image; the software components 110 are layers (such as containing executable codes or links thereto) that are added by corresponding buildpacks during a building of the container image.

In an embodiment of the present disclosure, corresponding component security indicators, or simply component scores, 115 are associated with the software components 110. Each component score 115 is indicative of a security level of the corresponding software component 110 defined by its vulnerability (for example, with the higher a version of the software component 110 the higher its security level).

Figure 1B:
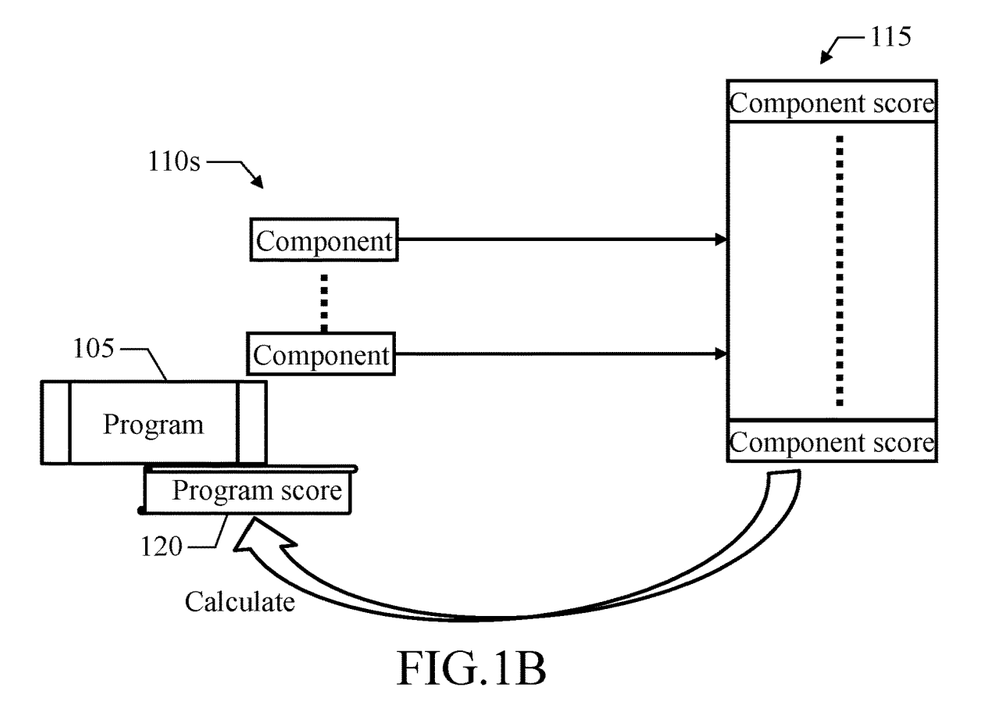

Referring now to FIG. 1B, a program security indicator, or simply program score 120 is calculated for the software program 105. The program score 120 is calculated according to the component scores 115 of its software components 110s (for example, as an average thereof). Therefore, likewise the program score 120 is indicative of a security level of the software program 105 (defined by its vulnerability).

Figure 1C:
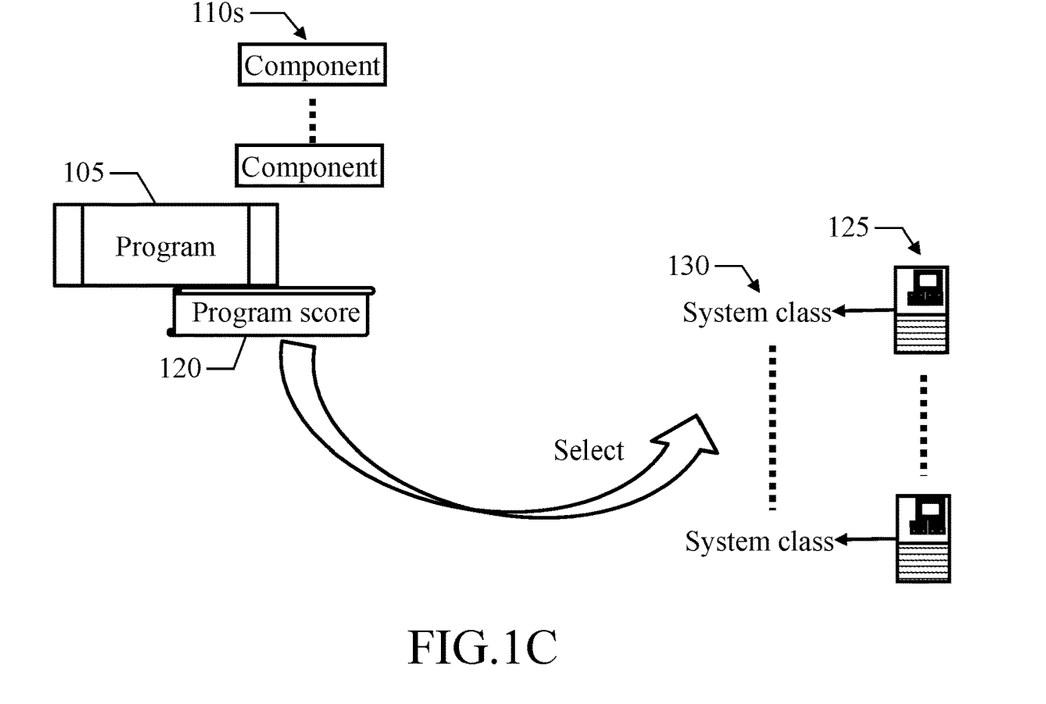

Referring now to FIG. 1C, a plurality of computing systems 125 are available for deploying the software program 105 (for example, nodes of the cloud provider). Corresponding system security indicators, or simply system classes 130 are associated with the computing systems 125. Each system class 130 is indicative of a security level of the corresponding computing system 125 (for example, defined by a range of the program scores of the software programs that are allowed to run thereon). One (or more) of the computing systems 125 is selected according to a comparison between the program score 120 and the system classes 130 (for example, the computing system 125 having the lowest security level that allows running the software program 105).

Figure 1D:
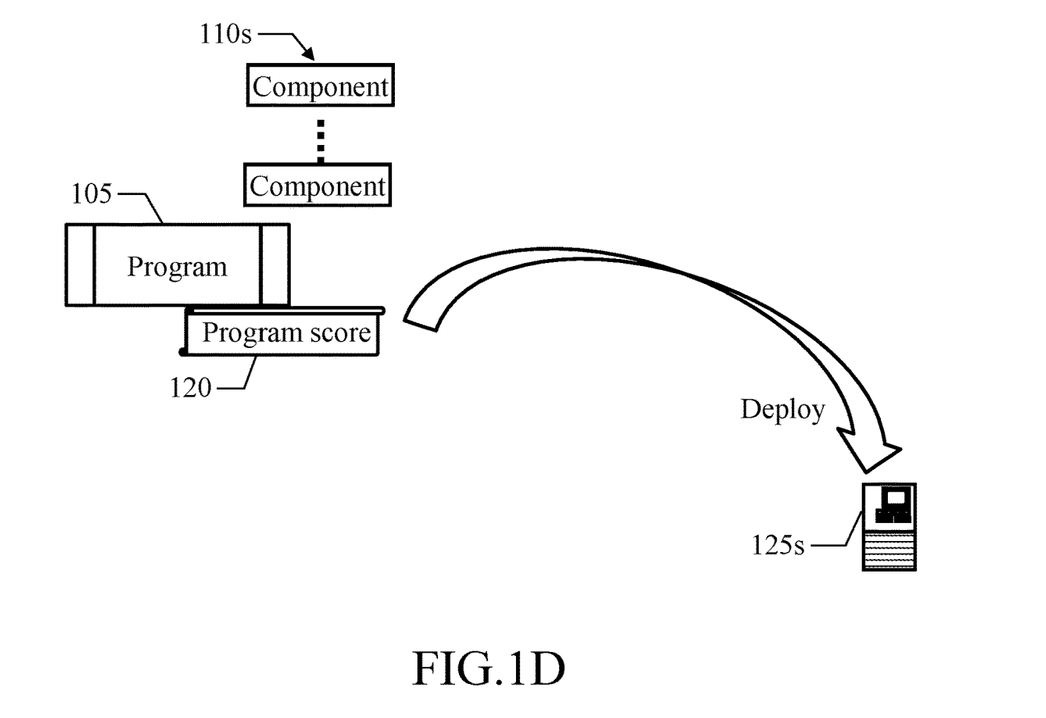

Referring now to FIG. 1D, the software program 105 is deployed to the (selected) computing system, differentiated with the reference 125s (for example, making it available to the corresponding user).

In this way, the deployment of the software programs may be optimized from a security point of view.

Particularly, it is possible to distribute the software programs throughout the computing systems so as to partition the software programs into homogenous groups having similar security levels. As a result, less secure software programs may be isolated from more secure software programs. It is then possible to avoid (or at least substantially reduce) the risk that the more secure software programs may be impacted by attacks exploiting the vulnerabilities of the less secure software programs. This is especially important in cloud (computing) environments, and particularly in case of PaaS functionalities, since it is possible to avoid (or at least substantially reduce) the risk that damages caused by attacks exploiting the vulnerabilities of the less secure software programs of a user may impact other users of the same cloud provider.

Moreover, it is possible to implement additional (security) countermeasures on the computing systems on which the less secure software programs run (for example, a zero-trust security model and/or a network bandwidth limitation). This allows reducing the risk of attacks to the computing systems running the less secure software programs, at the same time without any overhead of the other computing systems running the more secure software programs (and then without any degradation of their performance).

Figure 2:
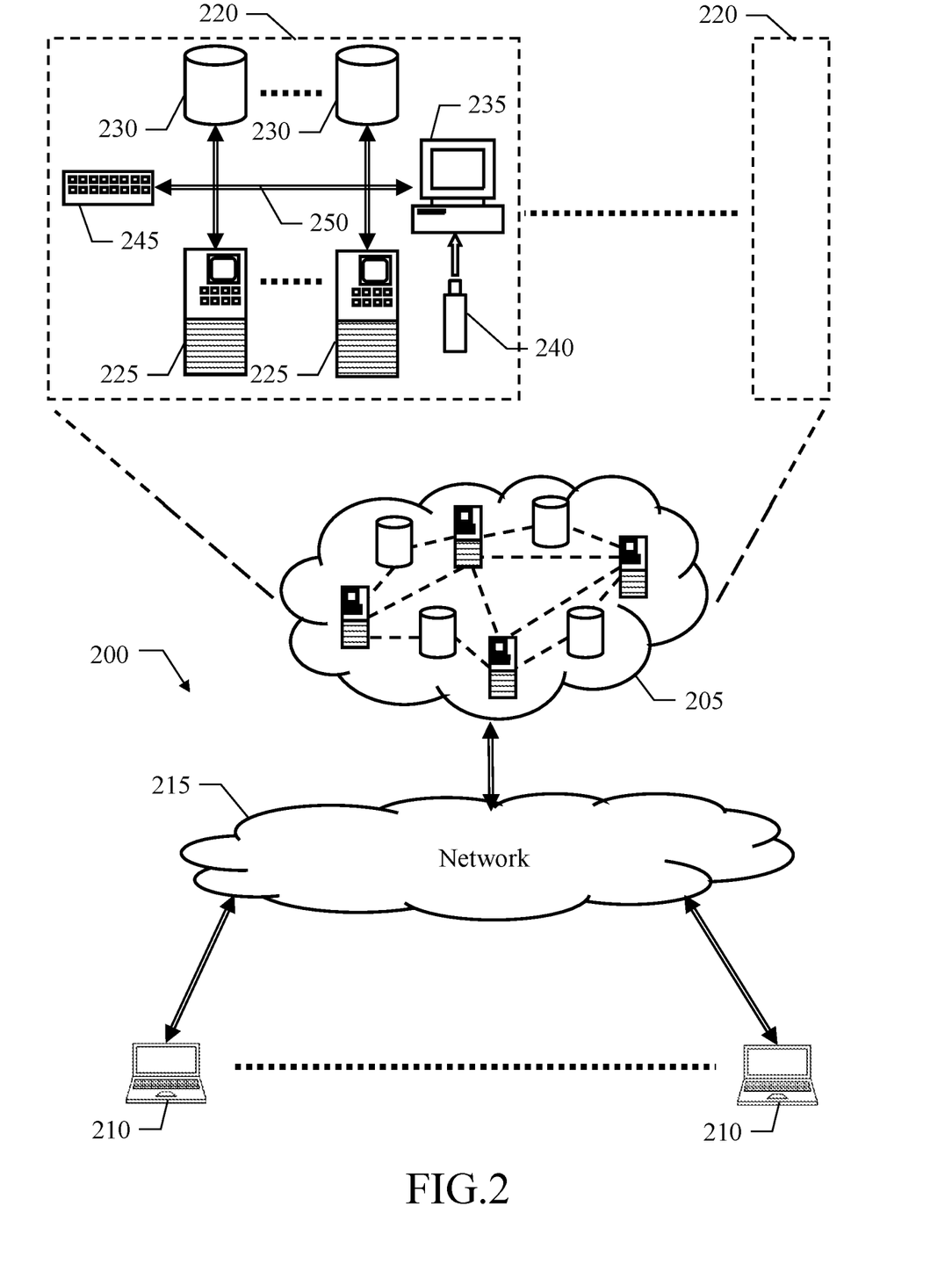
FIG. 2 shows a schematic block diagram of an information technology infrastructure that may be used to implement the solution according to an embodiment of the present disclosure.

With reference now to FIG. 2, a schematic block diagram is shown of an information technology infrastructure 200 that may be used to implement the solution according to an embodiment of the present disclosure.

The information technology infrastructure 200 comprises one or more cloud providers 205 (only one shown in the figure). Each cloud provider 205 is an entity that provides a pool of (cloud) services, which are implemented by computing resources that may be provisioned, configured and released very rapidly; the computing resources (generally of the virtual type, i.e., emulations by software of shared computing resources of physical type) are allocated upon request to users of the cloud provider 205, so that each user has the sole control of these computing resources (which may then be used exactly as if they were dedicated to the user). The services may be provided according to different deployment models, particularly, public cloud (i.e., for the general public), private cloud (i.e., for a single organization), community cloud (i.e., for several organizations) or hybrid cloud (based on a combination of different deployment models).

Particularly, the services comprise Platform as a Service (PaaS) functionalities. In this case, the cloud provider makes available corresponding (virtual) software platforms to its users. Each software platform implements a software environment wherein software applications, or simply apps, of the users (i.e., software programs performing specific tasks for them) may run. Typically, the software platform is made by an ecosystem of interconnected modules that support different activities of the entire life cycle of the apps, for example, their development, test, building, deployment, launching, maintenance and so on. In this way, the users are relived of the management of the actual physical (software) resources that are needed to implement the software platform; particularly, this provides economies of scale, improved exploitation of the physical resources and high peak-load capacity. Moreover, the users are now allowed to perform tasks (on a pay-per-use basis) that were not feasible previously because of their cost and complexity (especially for individuals or small companies). The de-coupling of the software platform from their implementation provides the illusion of an infinite capacity thereof. Moreover, the de-localization of the physical resources implementing the software platform enables the users to access them from anywhere.

The users connect to the cloud provider 205 with corresponding client computing machines, or simply clients 210 (for example, of the thin type) via a (communication) network 215. For example, the network 215 may be the Internet for a public/community cloud or a LAN for a private cloud. For this purpose, the cloud provider 205 exposes a front-end layer for accessing it (for example, via web browsers of the clients 210). The front-end layer interfaces with a back-end layer actually implementing the PaaS functionalities (which back-end layer is not accessible from the outside, so that the users are completely agnostic about its actual location and configuration).

The cloud provider 205 is implemented in one or more datacenters defining corresponding nodes 220 thereof. Each node 220 comprises multiple server computing systems, or simply servers 225 (for example, of the rack or blade type) and multiple storage units 230 (for example, disks of the RAID type) providing mass-memories thereof. In turn, each server 225 comprises (not shown in the figure) one or more microprocessors (μP) providing a logic capability of the server 225, a non-volatile memory (ROM) storing basic code for a bootstrap of the server, a volatile memory (RAM) used as a working memory by the microprocessors and a network adapter (NIC) for plugging the server 225 into the node 220. The node 220 also comprises a console 235 for controlling it (for example, a personal computer, also provided with a drive for reading/writing removable storage units 240, such as of USB type). A switch/router sub-system 245 manages any communications among the servers 225, the storage units 230 and the console 235, and with the network 215. For this purpose, the servers 225, the storage units 230 and the console 235 are connected to the switch/router sub-system 245 via a cabling sub-system 250.

Figure 3:
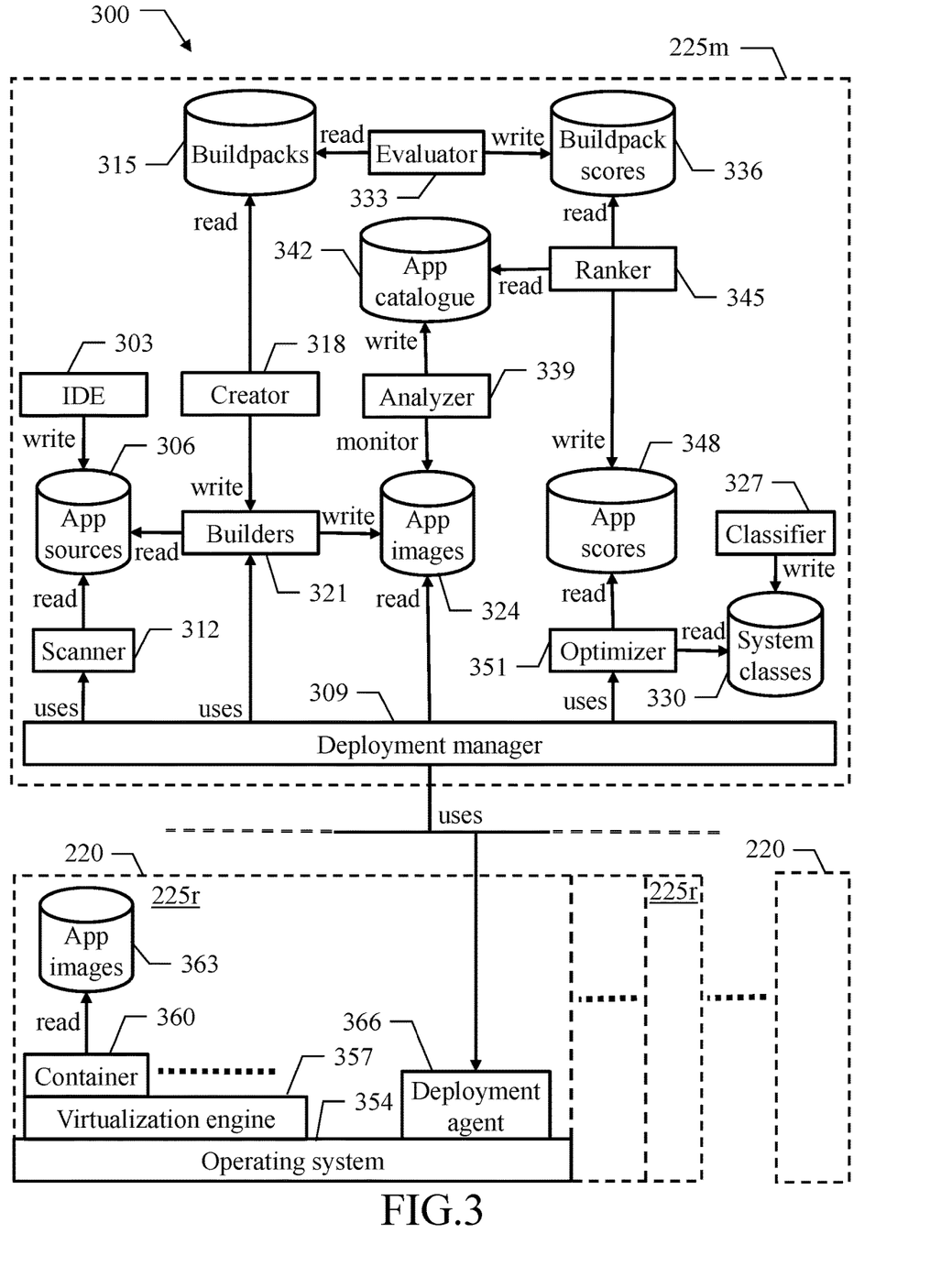
FIG. 3 shows the main software components that may be used to implement the solution according to an embodiment of the present disclosure.

With reference now to FIG. 3, the main software components are shown that may be used to implement the solution according to an embodiment of the present disclosure.

Particularly, all the software components (programs and data) are denoted as a whole with the reference 300. The software components 300 are typically stored in the mass memory and loaded (at least partially) into the working memory of the servers 225 (see also FIG. 2) of a generic cloud provider when the programs are running, together with possible other software programs not directly relevant to the solution of the present disclosure (thus omitted in the figure for the sake of simplicity). The programs are installed into the mass memory, for example, from removable storage units or from the network (not shown in the figure). In this respect, each program may be a module, segment or portion of code, which comprises one or more executable instructions for implementing the specified logical function.

One or more (management) servers, differentiated with the reference 225m are used to manage the life cycle of the apps of the users of the cloud provider. A generic management server 225m comprises the following components for each user, running in a completely isolated environment (such as a corresponding virtual machine).

An Integrated Development Environment (IDE) 303 provides a single comprehensive environment with several utilities for developing the apps of the user (such as editing, debugging, versioning and so on). The IDE 303 writes an app source repository 306, which comprises the apps being developed in source code (app sources). A deployment manager 309 manages the deployment of the apps (once their development has been completed). The deployment manager 309 uses a malware scanner 312. The malware scanner 312 scans the app sources to be deployed to detect any malwares (for example, viruses, worms, trojans, ransomware, spyware, adware, scareware and so on). For this purpose, the malware scanner 312 may exploit either a syntactic or semantic approach, based on different techniques (such as signature-based, heuristic and so on). The malware scanner 312 reads the app source repository 306. A buildpack repository 315 contains a plurality of buildpacks. Each buildpack is a component that is designed to detect the app sources to which the buildpack is applicable and to contribute to building corresponding app images for their deployment. A builder creator 318 allows the user to create one or more builders 321. Each builder 321 comprises one or more buildpacks, a lifecycle and a stack. The buildpacks are listed (in a desired order of their application) directly, in meta-buildpacks (each referring to one or more actual buildpacks) and in buildpack groups (each combining a plurality of buildpacks, either mandatory or optional, that are applicable or not as a whole). The lifecycle orchestrates the execution of the buildpacks. The stack is formed by a build image and a reference to a run image; the build image provides an execution environment of the lifecycle (and then of the buildpacks), whereas the run image provides an execution environment of the app images that are built by the builder 321. The builder creator 318 reads the buildpack repository 315 and it writes the builders 321. The deployment manager 309 uses the builders 321 to build the app images of the apps to be deployed. The app images provide the apps in a form that is directly runnable on several operating systems, for example, compliant with the Open Container Image (OCI) specification. Particularly, each app image comprises the corresponding app, its run image and possible executable layers given by contributions of the applicable buildpacks. The builders 321 read the app source repository 306 and they write an app image repository 324, which contains the app images that have been built; the deployment manager 309 reads the app image repository 324 for deploying the app images to the nodes of the cloud provider.

In the solution according to an embodiment of the present disclosure, a classifier 327 classifies the nodes of the cloud provider according to their security levels, by associating each of them with one of a discrete set of disjoint system classes for different security levels (for example, 10 system classes from 1 to 10 for decreasing security level). The classifier 327 writes a system class repository 330, which stores the corresponding system classes of the nodes of the cloud provider. An evaluator 333 evaluates the component scores of the buildpacks (referred to as buildpack scores in the following) according to their security levels (for example, ranging from 1 to 10 for decreasing security level). The evaluator 333 reads the buildpack repository 315. The evaluator 333 writes a buildpack score repository 336, which stores the corresponding buildpack scores of the buildpacks. An analyzer 339 analyzes the app images by monitoring their building (either directly in the corresponding repository 324 or via the builders 321, not shown in the figure); particularly, the analyzer 339 determines the buildpacks that have contributed to build each app image. The analyzer 339 writes an app catalogue 342. The app catalogues 342 has an entry for each app image, which entry stores a list of its (applicable) buildpacks. A ranker 345 ranks the app images by calculating their program scores (referred to as app scores in the following) according to the corresponding buildpack scores (for example, again ranging from 1 to 10 for decreasing security level). The ranker 345 reads the buildpack score repository 336 and the app catalogue 342. The ranker 345 writes an app score repository 348, which stores the corresponding app scores of the apps. The deployment manager 309 uses an optimizer 351, which selects the nodes to be used for deploying the app images. The optimizer 351 reads the system class repository 330 and the app score repository 348.

A plurality of (running) servers, differentiated with the reference 225r, are used to run the app images in the corresponding nodes 220 of the cloud provider. The running servers 225r of each node 220 (only one detailed in the figure) are organized in a cluster; the cluster acts as a single logical entity, which provides one or more cloud services in response to corresponding requests submitted thereto from the outside (with the requests that are automatically assigned to the running servers 225*r* that are best suited to their handling). Each running server 225*r* (only one detailed in the figure) comprises the following components.

An operating system 354 (directly running on the hardware of the running server 225*r*) defines a software platform on top of which any other software programs may run. A virtualization engine 357 (for example, based on the Docker technology of Docker Inc., trademarks thereof) emulates different instances of the operating system 354 by exploiting resource isolation features provided by it. One or more containers 360 run on top of the virtualization engine 357. The containers 360 are (stand-alone) executable packages, which comprise everything required to run apps but without their operating system (or at least a kernel thereof); the containers 360 share the operating system 354, running in isolated processes that use virtualized computing resources allocated thereto by the virtualization engine 357. Each container 360 reads one or more app images 363 whose apps run in the corresponding (isolated) process (with the app images 363 that use a read-write layer of the container 360 for writing private data). A dedicated running server 225*r* of each server farm (the same one detailed in the figure) also runs a deployment agent 366; the deployment agent is used by the deployment manager 309 to deploy the app images 363 that are to run on the node 220; particularly, the deployment agent 366 receives the app images 363 and distributes them to all the running servers 225*m* of the node 220.

Figure 4A:
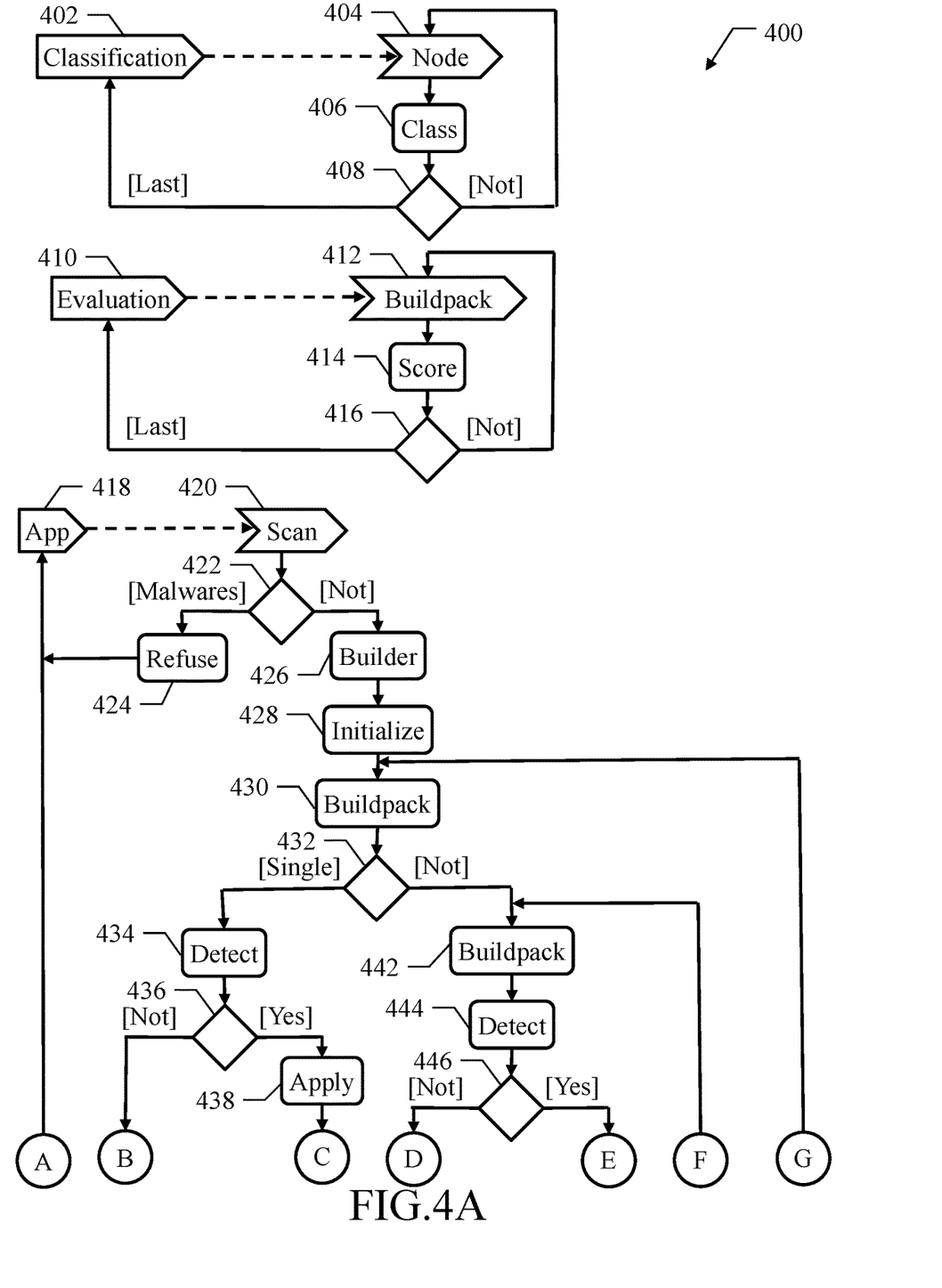
FIGS. 4A-4B show an activity diagram describing the flow of activities relating to an implementation of the solution according to an embodiment of the present disclosure.
Figure 4B:
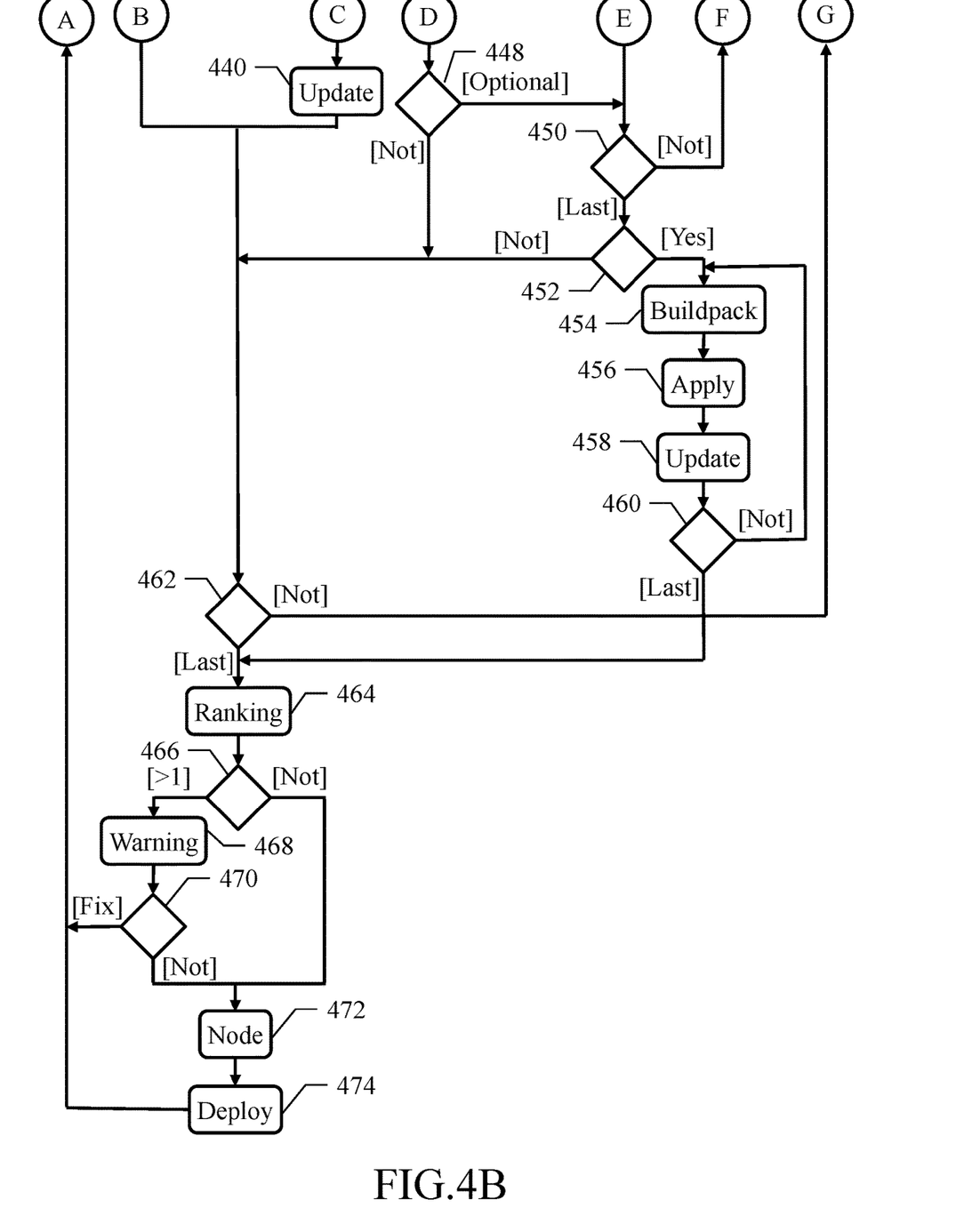

With reference now to FIGS. 4A-4B, an activity diagram is shown describing the flow of activities relating to an implementation of the solution according to an embodiment of the present disclosure.

Particularly, the diagram represents an exemplary process that may be used to deploy apps to the nodes of a generic cloud provider with a method 400. In this respect, each block may correspond to one or more executable instructions for implementing the specified logical function on the corresponding management server.

The process passes from block 402 to block 404 as soon as a (classification) event requiring a classification of the nodes occurs. For example, this happens whenever a node is added or a node is removed, the security countermeasures of one or more nodes are updated, a load balancing of the nodes is required and so on. In response thereto, a loop is entered wherein the classifier takes a (current) node into account (starting from a first one in any arbitrary order). The classifier at block 406 determines the system class of the node (and updates the corresponding repository accordingly). For example, the system class is selected according to a corresponding range of the app scores of the apps that are allowed to run on the node. Moreover, the system class may also depend on the security countermeasures that are implemented in the node. The security countermeasures are aimed at reducing the risk of attacks to the node by preventing them, eliminating or reducing the corresponding damages, or facilitating their discovery. The system class decreases as the security countermeasures increase; therefore, the lower the security level of the apps (higher app scores) the higher the security countermeasures of the nodes wherein they are allowed to run (so as to reduce the risks of possible attacks exploiting their vulnerabilities). For example, the (least secure) nodes with the lowest system class implement a zero-trust security model and/or a network bandwidth limitation. In the zero-trust security model, every activities to be performed are not trusted by default. Therefore, an accurate verification is performed individually for each request of performing a corresponding activity (for example, by strong user/machine authentication, access control policies and so on). The network bandwidth limitation constraints a network bandwidth of each app for incoming/outcoming communications, to defend from Denial-of-Service (DoS) attacks attempting to flood the nodes so as to make them unavailable, and especially Distributed Dos (DDoS) attacks originating from many different sources. The classifier at block 408 verifies whether a last node has been processed. If not, the flow of activity returns to block 404 for repeating the same operations on a next node. Conversely (once all the nodes have been processed), the loop is exit and the process returns to block 402 waiting for a next classification event.

In a completely independent way, the process passes from block 410 to block 412 as soon as an (evaluation) event requiring an evaluation of one or more (affected) buildpacks occurs. For example, this happens whenever a new buildpack is delivered for it, whenever a new version of a buildpack is delivered for all its versions, whenever a new vulnerability is discovered for one or more buildpacks exhibiting it, whenever a patch is delivered for one or more buildpacks to which it has been applied and so on. In response thereto, a loop is entered wherein the evaluator takes a (current) buildpack of the affected buildpacks into account (starting from a first one in any arbitrary order). The evaluator at block 414 determines the buildpack score of the buildpack (and updates the corresponding repository accordingly). Particularly, the buildpack score increases when new vulnerabilities are discovered (less secure buildpack); conversely, the buildpack score decreases when new patches are applied removing known vulnerabilities (more secure buildpack). Moreover, in case of a same app being available in different versions, the buildpack score decreases as the version increases (the higher the version the higher the security level). The evaluator at block 416 verifies whether a last affected buildpack has been processed. If not, the flow of activity returns to block 412 for repeating the same operations on a next affected buildpack. Conversely (once all the affected buildpacks have been processed), the loop exits and the process returns to block 410 waiting for a next evaluation event.

In a completely independent way, the process passes from block 418 to block 420 whenever the deployment manager receives a deployment request, which is submitted by a generic user of the cloud provider requiring to deploy a (new) app thereof (via a client of the user). In response thereto, the deployment manager commands the malware scanner to scan the app source of this app (retrieved from the corresponding repository). The flow of activity branches at block 422 according to a result of the scan of the app source. If any malware is detected in the app source, the deployment manager at block 424 refuses the deployment of the app, for example, by outputting a corresponding error message (such as displayed on the monitor of the client). The process then returns to block 418 waiting for a next deployment request.

Referring back to block 422, if no malware is detected in the app source the deployment manager at block 426 invokes a (selected) builder for building the corresponding app image. The selected builder may be specified in the deployment request by the user (for example, chosen by the user exploiting a utility that provides a list of suggested builders being determined automatically by examining the app source) or it may be determined automatically by the same utility. The lifecycle of the builder at block 428 initializes the app image. Particularly, the lifecycle retrieves the run image of its stack; moreover, the lifecycle retrieves the app source (from the corresponding repository) and compiles it, if necessary. The lifecycle adds the run image and the app (in executable form) to the app image, and it sets an entry point for launching the app. A loop is then entered at block 430, wherein the lifecycle takes a (current) buildpack of the builder into account, starting from a first one along the order of their listing in the builder (possibly after expanding any meta-buildpacks into the corresponding actual buildpacks).

The flow of activity branches at block 432 according to a type of the buildpack. If the buildpack is single, the lifecycle at block 434 invokes the buildpack to detect whether it is applicable to the app source. This (detect) operation may be performed in different ways, for example, by looking for one or more specific files, configuration variables and so on. The flow of activity branches at block 436 according to a result of the detect operation. If the buildpack is applicable to the app source, the lifecycle at block 438 invokes the buildpack to apply the buildpack to the app source thereby providing its contribution to the building of the app image. This (build) operation may be performed in different ways, for example, by setting one or more environment variables, specifying app dependencies, adding a corresponding executable layer and so on. At the same time, the analyzer at block 440 adds an indication of the buildpack (being applied to the app image) to the corresponding entry in the app catalogue (creating it if necessary).

Referring back to block 432, if the buildpack is a (buildpack) group, the lifecycle detects whether the group as a whole is applicable to the app source. For this purpose, a loop is performed for detecting whether the buildpacks of the group are applicable to the app source (with the corresponding operations that may also be performed in parallel). Particularly, the loop is entered at block 442, wherein the lifecycle takes a (current) buildpack of the group into account, starting from a first one along the order of their listing in the group. The lifecycle at block 444 invokes the buildpack to verify as above whether the buildpack is applicable to the app source. The flow of activity branches at block 446 according to a result of this (detect) operation. If the buildpack is not applicable to the app source, the flow of activity further branches at block 448 according to a type of the buildpack. If the buildpack is optional, the process continues to block 450; the same point is also reached from block 446 if the buildpack is applicable to the app source. At this point, the lifecycle verifies whether a last buildpack of the group has been processed. If not, the flow of activity returns to block 442 for repeating the same operations on a next buildpack of the group. Conversely (once all the buildpacks of the group have been processed), the loop is exit by descending into block 454. The flow of activity now branches according to an aggregate result of the above-described detect operations. If at least one buildpack of the group has been found applicable to the source image (comprising all its mandatory buildpacks for above), the group as a whole is deemed applicable as well. In this case, a loop is performed for applying the (applicable) buildpacks of the group to the app source. The loop begins at block 454, wherein the lifecycle takes a (current) buildpack of the applicable buildpacks of the group into account, starting from a first one along the order of their listing in the group. The lifecycle at block 456 invokes the buildpack to apply the buildpack to the app source as above (thereby providing its contribution to the building of the app image). At the same time, the analyzer at block 458 adds an indication of the buildpack (being applied to the app image) to the corresponding entry in the app catalogue (creating it if necessary). The lifecycle at block 460 verifies whether a last applicable buildpack of the group has been processed. If not, the flow of activity returns to block 454 for repeating the same operations on a next applicable buildpack of the group.

Referring back to block 436, if the (single) buildpack is not applicable to the app source the process descends into block 462 (so as to skip the buildpack). The same point is also reached in case of a group from block 448 if the buildpack (being not applicable) is mandatory or from block 452 if no buildpack of the group (being all optional for above) is applicable, meaning that the group as a whole is not applicable as well (so as to skip the group). The lifecycle now verifies whether a last buildpack of the builder has been processed. If not, the flow of activity returns to block 430 for repeating the same operations on a next buildpack of the builder. Conversely (once all the buildpacks of the builder have been processed), the loop is exit by descending into block 464. The same point is also reached from block 460 once all the applicable buildpacks of the (applicable) group have been processed; in this way, only the first applicable group of the builder by order is applied to the app source (with any possible next groups of the builder that are skipped). The ranker now calculates the app score of the app according to the buildpack scores (retrieved from the corresponding repository) of the buildpacks that have been applied to the app source to build the app image (as indicated in the app catalogue). For example, the app score is set to the arithmetic mean of the buildpack scores. The flow of activity branches at block 466 according to the app score. If the app score is (possibly strictly) higher than a (security) threshold, meaning that the security level of the app is too low (for example, >1), the optimizer at block 468 outputs a warning message suggesting the user to improve the security level of the app; for example, the optimizer suggests the user to replace (old) versions of the applicable buildpacks with newer versions thereof (having higher security levels). The flow of activity branches at block 470 according to a decision of the user (entered by a corresponding command). If the user decides to fix the app (for example, by selecting a builder with upgraded buildpacks so as to make the app more secure) the process returns to block 418 waiting for a next deployment request (comprising the one of the same app with improved security level). This promotes a culture of more secure development of the apps. Conversely, if the user decides to stay with this (less secure) app, the process descends into block 472; the same point is also reached directly from block 466 if the app score is (possibly strictly) lower than the security threshold, meaning that the security level of the app is acceptable (≤1 in the example at issue). The optimizer now selects a (selected) node of the cloud provider according to a comparison of the app score with the system classes of the nodes of the cloud provider (retrieved from the corresponding repository). For example, the optimizer determines a (selected) system class that is the lowest one being equal to or greater than the app score. Therefore, the selected system class is 1 for the app score ≤1, 2 for the app score >1 and ≤2, 3 for the app score >2 and ≤3 and so on up to 10 for the app score >9. The optimizer than determines the selected node among all the nodes of the cloud provider having the selected system class (for example, the one with the lowest workload). In this case, the optimizer (at block 468 above) suggests the user to improve the security level of the app (with app score >1) whenever it is not adapted to be deployed to the most secure nodes of the cloud provider (with system class =1). The deployment manager at block 474 deploys the app image (retrieved from the corresponding repository) to the selected node. The process then returns to block 418 waiting for a next deployment request.

Figure 5:
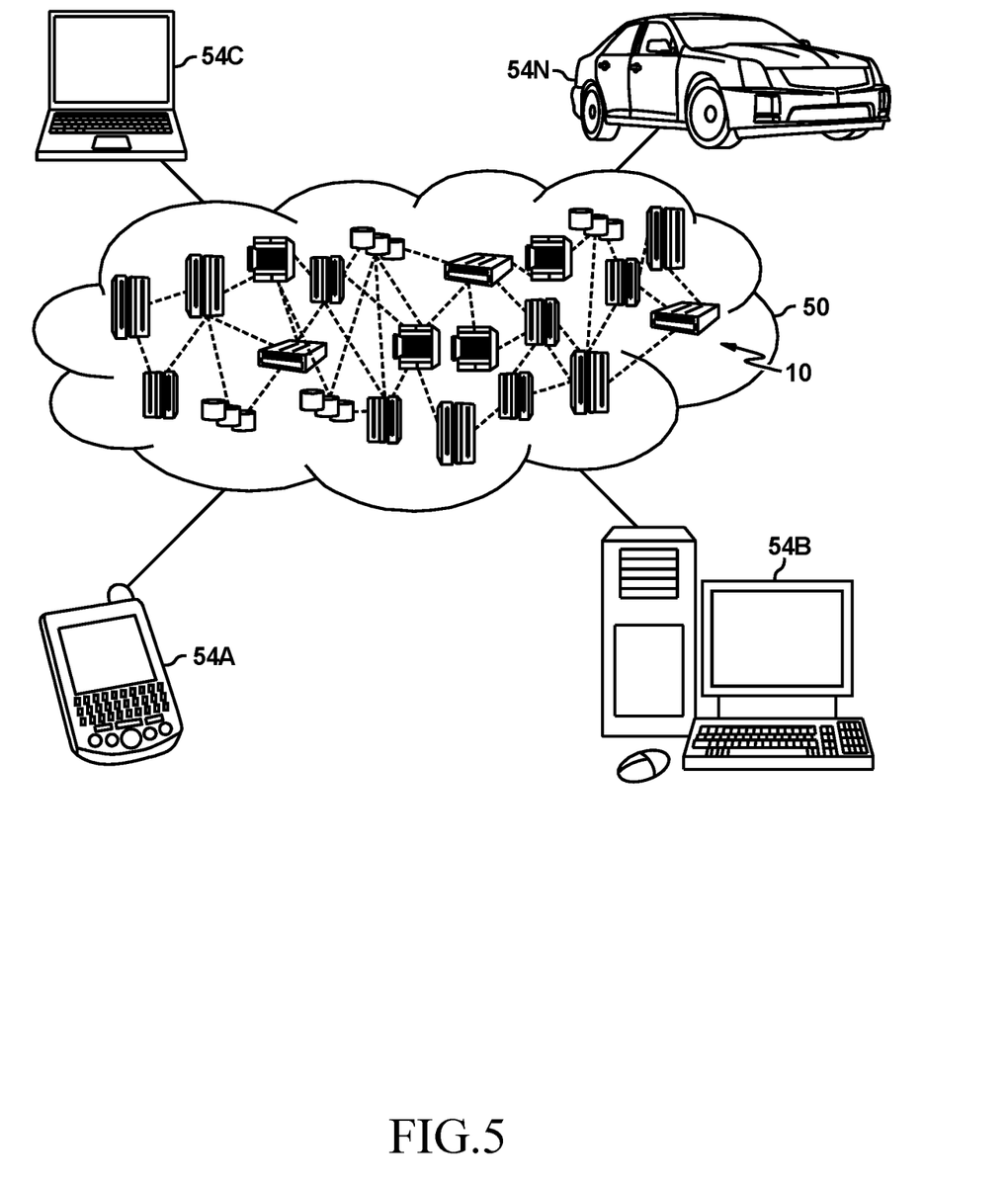
FIG. 5 depicts a cloud computing environment according to an embodiment of the present disclosure.

With reference now to FIG. 5, a cloud computing environment is depicted according to an embodiment of the present disclosure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to the FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
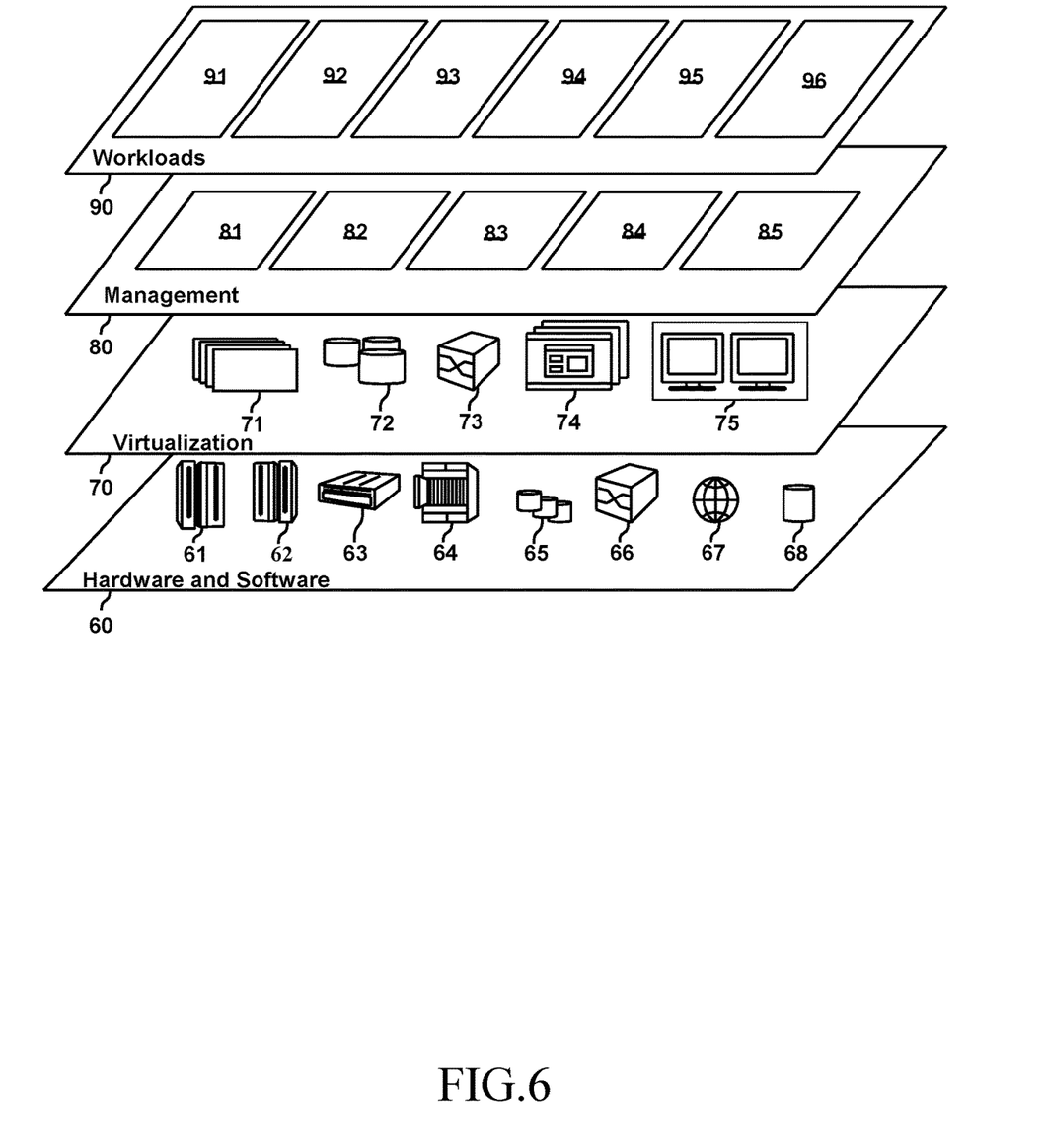
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recertification management 96.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced even without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for deploying software programs. However, the software programs may be in any number and of any type (for example, software applications, middleware, operating systems and so on).

In an embodiment, for each of the software programs the method comprises the following steps under the control of a deployment computing system. However, the deployment computing system may be of any type (see below).

In an embodiment, the method comprises determining (by the deployment computing system) one or more selected software components of a plurality of software components being used by the software program. However, the software components may be in any number and of any type (for example, buildpack layers, libraries, other software programs and so on) and the selected software components may be in any number and used by the software program in any way (for example, embedded, linked dynamically, invoked as prerequisites, as so on); moreover, the selected software components may be determined in any way (for example, during a building of the software program, by scanning the software program either before or after its building, by reading a manifest file of the software program and so on).

In an embodiment, the software components are associated with corresponding component security indicators being indicative of security levels thereof. However, the component security indicators may be of any type (for example, continuous/discrete, with any range of values, decreasing/increasing with the security level, depending on versions, known vulnerabilities, applied security patches and so on).

In an embodiment, the method comprises calculating (by the deployment computing system) a program security indicator being indicative of a security level of the software program according to the component security indicators of the selected software components. However, the program security indicator may be of any type (for example, either the same or different with respect to the component security indicators) and it may be calculated in any way (for example, as weighted/non-weighted mean, such as arithmetic, geometric, harmonic and the like, median or any other linear/non-linear function of the component security indicators of the selected software components).

In an embodiment, the method comprises selecting (by the deployment computing system) at least one selected computing system among a plurality of target computing systems being available for deploying the software program. However, the target computing systems may be in any number and of any type (for example, cloud nodes, datacenters, single servers and so on).

In an embodiment, the selected computing system is selected according to a comparison between the program security indicator and corresponding system security indicators being indicative of security levels of the target computing systems. However, the system security indicators may be of any type (for example, discrete/continuous, with any range of values, decreasing/increasing with the security level, associated with corresponding ranges of the program security indicators of the software programs that are allowed to run thereon, associated with minimum/maximum values of the program security indicators of the software programs that are allowed to run thereon, based on security countermeasures, based on security vulnerabilities, any combination thereof and so on); moreover, the selected computing system may be determined in any way (for example, having the lowest level of security that allows running the software program, the system security indicator that is closest to the program security indicator and so on).

In an embodiment, the method comprises deploying (by the deployment computing system) the software program to the selected computing system. However, the software program may be deployed in any way (for example, in the form of a container image, a virtual machine image, a distribution package and so on, by uploading the software program to the selected computing system that then installs it autonomously, by installing the software program directly on the selected computing system, by uploading the software program to a cluster that then distributes it to all its nodes or part of them, and so on).

Further embodiments provide additional advantageous features, which may however be omitted at all in a basic implementation.

In an embodiment, the method comprises scanning, by the deployment computing system, the software program for detecting any malware. However, the software program may be scanned with any technique for detecting any malware (for example, partial, different and additional techniques and/or malwares with respect to the ones mentioned above).

In an embodiment, the method comprises conditioning, by the deployment computing system, said deploying the software program according to a result of said scanning the software program. However, the deployment of the software program may be conditioned in any way according to the result of its scanning (for example, by refusing/allowing it, deploying the software program with any malware deleted or quarantined, either automatically or after a manual confirmation, and so on).

In an embodiment, the system security indicators are indicative of corresponding ranges of the program security indicators of the software programs allowed to run on the corresponding target computing systems. However, the ranges may be of any type (for example, with any widths, uniform or increasing/decreasing with the security level and so on).

In an embodiment, the method comprises outputting (by the deployment computing system) a warning message in response to the system security indicator of the selected computing system being indicative of the security level thereof lower than a security threshold. However, the warning message may be of any type (for example, a message displayed on a monitor, a communication sent via instant message, SMS, e-mail and the like, an acoustic alarm and so on) and it may be output in response to the security level of the selected computing system being lower than any security threshold (for example, fixed, customizable, based on the program security indicators of all the deployed software programs, such as a percentage of their mean, and so on).

In an embodiment, the warning message is for causing a user to improve the security level of the software program. However, the security level of the software program may be improved in any way (for example, with higher versions of its software components, with similar software components having higher security levels and so on) and at any time (for example, by aborting the deployment of the (unsecure) software program for its fixing, by deploying the unsecure software program in any case for fixing it later on and so on).

In an embodiment, one or more of the target computing systems having the corresponding system security indicators being indicative of the security levels thereof lower than a minimum threshold implement a zero-trust security model. However, these target computing systems may be defined in any way (for example, the ones having the system security indicators being indicative of the lowest security level, lower than a certain value and so on); moreover, the zero-trust security model may be applied in any way (for example, with partial, different and additional security countermeasures with respect to the ones mentioned above).

In an embodiment, one or more of the target computing systems having the corresponding system security indicators being indicative of the security levels thereof lower than a minimum threshold implement a bandwidth limitation for the software programs running thereon. However, these target computing systems may be defined in any way (for example, either the same or different with respect to above); moreover, the bandwidth limitation may be applied in any way (for example, by limiting incoming and/or outcoming communications in terms of amount of data, frequency and the like below any maximum threshold, such as defined by a specific value, a multiple of a typical value for the whole target computing system or of corresponding typical values for the software programs, and so on).

In an embodiment, the method comprises receiving (by the deployment computing system) a source version of the software program. However, the source version may be of any type (for example, in source code, in executable code and so on) and it may be received in any way (for example, developed in the deployment computing system, uploaded by a different (development) computing system and so on).

In an embodiment, the method comprises determining (by the deployment computing system) the selected software components according to the source version of the software program. However, the selected software components may be determined in any way (for example, by corresponding buildpacks, a common scanner and so on).

In an embodiment, the method comprises creating (by the deployment computing system) a target version of the software program for the deploying thereof according to the source version of the software program and the selected software components. However, the target version of the software program may be created in any way (for example, by compiling or not the software program, by embedding or linking the software components, by adding or not a run image for the software program, and so on).

In an embodiment, the method comprises detecting (by the deployment computing system) one or more applicable buildpacks of a plurality of buildpacks being applicable to the source version of the software program by inspecting the source version of the software program by each of the buildpacks. However, the buildpacks may be in any number and of any type (for example, single buildpacks, meta-buildpacks, buildpack groups with mandatory and/or optional buildpacks, and so on); moreover, the applicable buildpacks may be in any number and detected in any way (for example, every buildpacks passing detection, only the first buildpack group passing detection, every buildpack groups passing detection and so on).

In an embodiment, the method comprises building (by the deployment computing system) the target version of the software program by adding corresponding contributions thereto by the applicable buildpacks. However, the contributions of the applicable buildpacks may be of any type (for example, partial, different and additional contributions with respect to the ones mentioned above).

In an embodiment, the method comprises building (by the deployment computing system) a container image implementing the target version of the software program. However, the container image may be of any type (for example, containing a fully-dedicated run image, a link to a read-only layer being shared with other container images and a read-write layer dedicated to the container image with a redirect-on-write technique, and so on).

In an embodiment, one or more multi-revision components of the software components each is available in a plurality of revisions. However, the multi-revision components may be in any number, each with any number of revisions defined in any way (for example, versions, releases, service packs, applied patches and so on).

In an embodiment, the method comprises setting (by the deployment computing system) the corresponding component security indicators of the revisions of each of the multi-revision components to be indicative of increasing security levels for increasing revisions of the multi-revision component. However, the component security indicators may change with the revisions in any way (for example, decreasing/increasing, with steps being uniform or changing linearly/non-linearly with the revisions and/or their impact, and so on).

In an embodiment, the target computing systems implement a cloud computing environment for running the software programs. However, the cloud computing environment may be of any type (for example, providing PaaS, SaaS, IaaS and/or NaaS functionalities, implementing a public, private, community or hybrid cloud model, and so on); in any case, the application of the same technique to other processing environments (for example, a client-server environment) is not excluded.

In an embodiment, the cloud computing environment provides a PaaS functionality for the software programs being corresponding software applications. However, the PaaS functionality may be of any type (for example, with partial, different and additional utilities with respect to the ones mentioned above) for running any type of software applications (for example, implementing e-commerce, reservations, CRM and so on functionalities).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a deployment computing system to perform the method of above when the computer program is executed on the deployment computing system. An embodiment provides a computer program product that comprises one or more computer readable storage media having program instructions collectively stored in said one or more computer readable storage media, the program instructions readable by a deployment computing system to cause the deployment computing system to perform the same method. However, the program may be implemented as a stand-alone module, as a plug-in for a pre-existing program (for example, a software deployment application) or even directly in the latter; moreover, the program may take any form suitable to be used by any deployment computing system (see below).

An embodiment provides a system comprising means that are configured for performing the steps of the above-described method. An embodiment provides a system comprising a circuitry (i.e., any hardware suitably configured, for example, by software) for performing each step of the same method. However, the system may be of any type (for example, a deployment computing system implemented by a server, a virtual machine, a PC and so on).

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for deploying software programs under control of a deployment computing system, the method comprising:
   determining, by the deployment computing system, one or more selected software components of a plurality of software components being used by a software program, the selected software components being associated with corresponding component security indicators being indicative of security levels thereof,
   calculating, by the deployment computing system, a program security indicator being indicative of a security level of the software program according to the component security indicators of the selected software components,
   selecting, by the deployment computing system, at least one selected computing system among a plurality of target computing systems being available for deploying the software program according to a comparison between the program security indicator and corresponding system security indicators being indicative of security levels of the target computing systems, and
   deploying, by the deployment computing system, the software program to the selected computing system.

2. The method according to claim 1, further comprising:
   scanning, by the deployment computing system, the software program for detecting any malware; and
   conditioning, by the deployment computing system, said deploying the software program according to a result of the scanning of the software program.

3. The method according to claim 1, wherein the system security indicators are indicative of corresponding ranges of the program security indicators of the software programs allowed to run on the corresponding target computing systems.

4. The method according to claim 1, further comprising:
   outputting, by the deployment computing system, a warning message in response to the system security indicator of the selected computing system being indicative of the security level thereof lower than a security threshold for causing a user to improve the security level of the software program.

5. The method according to claim 1, wherein one or more of the target computing systems having the corresponding system security indicators being indicative of the security levels thereof lower than a minimum threshold implement a zero-trust security model.

6. The method according to claim 1, wherein one or more of the target computing systems having the corresponding system security indicators being indicative of the security levels thereof lower than a minimum threshold implement a bandwidth limitation for the software programs running thereon.

7. The method according to claim 1, further comprising:
receiving, by the deployment computing system, a source version of the software program;
determining, by the deployment computing system, the selected software components according to the source version of the software program; and
creating, by the deployment computing system, a target version of the software program for deploying thereof according to the source version of the software program and the selected software components.

8. The method according to claim 7, further comprising:
detecting, by the deployment computing system, one or more applicable buildpacks of a plurality of buildpacks being applicable to the source version of the software program by inspecting the source version of the software program by each of the plurality of buildpacks; and
building, by the deployment computing system, the target version of the software program by adding corresponding contributions thereto by the applicable buildpacks.

9. The method according to claim 7, further comprising:
building, by the deployment computing system, a container image implementing the target version of the software program.

10. The method according to claim 1, wherein one or more multi-revision components of the software components each is available in a plurality of revisions, the method further comprising:
setting, by the deployment computing system, the corresponding component security indicators of the revisions of each of the multi-revision components to be indicative of increasing security levels for increasing revisions of the multi-revision component.

11. The method according to claim 1, wherein the target computing systems implement a cloud computing environment for running software applications.

12. The method according to claim 11, wherein the cloud computing environment provides a PaaS functionality for the software programs that correspond to the software applications.

13. A computer program product for deploying software programs, the computer program product comprising one or more computer readable storage media having program instructions collectively stored in the one or more computer readable storage media, the program instructions readable by a deployment computing system to cause the deployment computing system to perform:
determining one or more selected software components of a plurality of software components being used by the software program, the software components being associated with corresponding component security indicators being indicative of security levels thereof,
calculating a program security indicator being indicative of a security level of the software program according to the component security indicators of the selected software components,
selecting at least one selected computing system among a plurality of target computing systems being available for deploying the software program according to a comparison between the program security indicator and corresponding system security indicators being indicative of security levels of the target computing systems, and
deploying the software program to the selected computing system.

14. A computer system comprising:
one or more computer readable storage media with program instructions collectively stored on the one or more computer readable storage media; and
one or more processors configured to execute the program instructions to perform a method for deploying software programs, the method comprising:
determining, with an analyzer, one or more selected software components of a plurality of software components being used by each of the software programs, the software components being associated with corresponding component security indicators being indicative of security levels thereof;
calculating, with a ranker, a program security indicator being indicative of a security level of each of the software programs according to the component security indicators of the selected software components of the software program;
selecting, with an optimizer, at least one selected computing system among a plurality of target computing systems being available for deploying each of the software programs according to a comparison between the program security indicator of the software program and corresponding system security indicators being indicative of security levels of the target computing systems; and
deploying, with a deployment manager, each of the software programs to the selected computing system of the software program.

* * * * *